US011583021B2

(12) United States Patent
Caven

(10) Patent No.: US 11,583,021 B2
(45) Date of Patent: *Feb. 21, 2023

(54) METHOD OF PROJECTING SEWING PATTERN PIECES ONTO FABRIC

(71) Applicant: NEWCO JODITO LLC, La Vergne, TN (US)

(72) Inventor: Elizabeth Caven, Des Moines, IA (US)

(73) Assignee: NEWCO JODITO LLC, Le Vergne, TN (US)

(*) Notice: Subject to any disclaimer, the term of this patent is extended or adjusted under 35 U.S.C. 154(b) by 131 days.

This patent is subject to a terminal disclaimer.

(21) Appl. No.: 17/001,040

(22) Filed: Aug. 24, 2020

(65) Prior Publication Data
US 2020/0383413 A1 Dec. 10, 2020

Related U.S. Application Data

(63) Continuation of application No. 15/853,807, filed on Dec. 24, 2017, now Pat. No. 10,750,810.

(51) Int. Cl.
*D05B 19/08* (2006.01)
*A41H 3/08* (2006.01)
*G03B 21/53* (2006.01)
*G09B 19/20* (2006.01)
*B26D 5/02* (2006.01)

(52) U.S. Cl.
CPC ............. *A41H 3/08* (2013.01); *B26D 5/02* (2013.01); *D05B 19/08* (2013.01); *G03B 21/53* (2013.01); *G09B 19/20* (2013.01)

(58) Field of Classification Search
CPC ........ D05B 19/08; D05B 19/02; D05B 19/06; D05B 19/12; D05B 19/14; B26D 5/02; B26D 5/007
See application file for complete search history.

(56) References Cited

U.S. PATENT DOCUMENTS

| | | | | |
|---|---|---|---|---|
| 943,326 A | * | 12/1909 | Thurnstone | |
| 2,053,073 A | * | 9/1936 | Gardner | G03B 21/00 352/90 |
| 3,784,259 A | * | 1/1974 | Munger | E21C 25/34 299/84.1 |
| 3,805,650 A | * | 4/1974 | Pearl | B26F 1/382 83/56 |
| 3,949,629 A | * | 4/1976 | Johnson | A41H 3/00 248/500 |
| 4,590,881 A | * | 5/1986 | Wada | D05B 19/02 112/456 |

(Continued)

*Primary Examiner* — Tajash D Patel
(74) *Attorney, Agent, or Firm* — Hahn Loeser & Parks LLP; Daniel J. Smola

(57) ABSTRACT

According to the present invention there is provided a method of projecting images of sewing patterns as templates onto fabrics. The contemplated application for the invention includes sewist making an article of clothing. As such, images of the patterns to be sewn are stored in a storage device for latter access from a computing device that sends them to a projecting device for projection. The projecting devices is then positioned, graduated, calibrated, and set for optimizing the cutting of the fabric. Thereafter, the operator may interactively modify the projected image, and as such initiates the cutting of the fabric, in accordance to the projected sewing patterns.

20 Claims, 3 Drawing Sheets

(56) References Cited

U.S. PATENT DOCUMENTS

| | | | | |
|---|---|---|---|---|
| 4,739,487 A * | 4/1988 | Bonnet | B29C 70/30 | 700/134 |
| 4,905,159 A * | 2/1990 | Loriot | B26D 5/005 | 700/134 |
| 4,941,183 A * | 7/1990 | Bruder | G06K 11/00 | 83/522.11 |
| 5,095,835 A * | 3/1992 | Jernigan | D05B 19/08 | 112/475.05 |
| 5,195,451 A * | 3/1993 | Nakashima | D05B 79/00 | 112/102.5 |
| 5,205,232 A * | 4/1993 | Sadeh | G05B 19/4083 | 112/475.03 |
| 5,323,722 A * | 6/1994 | Goto | G05B 19/4205 | 112/102.5 |
| 5,615,318 A * | 3/1997 | Matsuura | G06Q 10/043 | 345/441 |
| 5,663,885 A * | 9/1997 | Stahl | B26D 5/00 | 700/134 |
| 5,831,857 A * | 11/1998 | Clarino | G06Q 10/043 | 700/134 |
| 6,042,066 A * | 3/2000 | Maharg | A47B 96/1425 | 248/200.1 |
| 6,161,491 A * | 12/2000 | Takenoya | D05B 79/00 | 112/456 |
| 6,173,211 B1 * | 1/2001 | Williams | B41J 2/01 | 700/131 |
| 6,301,518 B1 * | 10/2001 | Kawaguchi | G06T 11/60 | 700/131 |
| 6,379,011 B1 * | 4/2002 | Knox | H04N 9/3114 | 353/31 |
| 6,434,444 B2 * | 8/2002 | Herman, Jr. | B26D 5/005 | 700/134 |
| 6,554,235 B1 * | 4/2003 | Fortier | A47B 91/02 | 248/200.1 |
| 6,612,533 B2 * | 9/2003 | Biles | E04F 21/00 | 248/125.3 |
| 6,792,865 B2 * | 9/2004 | Brunet-Manquat | G06K 15/02 | 358/1.9 |
| 6,856,843 B1 * | 2/2005 | Herman, Jr. | B26D 5/005 | 700/95 |
| 6,859,679 B1 * | 2/2005 | Smith | D05B 19/04 | 112/458 |
| 7,212,880 B2 * | 5/2007 | Mizuno | D05B 19/08 | 112/470.07 |
| 7,338,411 B2 * | 3/2008 | Blacker | A63B 21/1681 | 482/904 |
| 7,716,143 B2 * | 5/2010 | Shemula | G06Q 30/0641 | 705/500 |
| 7,813,823 B2 * | 10/2010 | Torrini | G06F 3/165 | 700/94 |
| 7,814,832 B2 * | 10/2010 | Franz | D06P 5/30 | 101/35 |
| 8,116,895 B2 * | 2/2012 | Fernandez | A61B 5/0002 | 700/132 |
| 9,107,462 B1 * | 8/2015 | Heinrich | G06Q 30/0621 | |
| 9,267,222 B2 * | 2/2016 | Schnaufer | D05B 11/00 | |
| 9,378,593 B2 * | 6/2016 | Chhugani | A41H 1/00 | |
| 9,406,170 B1 * | 8/2016 | Grampurohit | G06T 3/005 | |
| 9,462,838 B1 * | 10/2016 | Smith | A41H 1/02 | |
| 9,650,734 B2 * | 5/2017 | Elliott | D05B 19/08 | |
| 9,791,267 B2 * | 10/2017 | Bismuth | A41H 1/02 | |
| 9,852,533 B2 * | 12/2017 | Harvill | G06V 10/22 | |
| 9,949,519 B2 * | 4/2018 | Koh | G06F 30/00 | |
| 10,143,253 B2 * | 12/2018 | Faupel | A41H 3/00 | |
| 10,176,617 B2 * | 1/2019 | Harvill | G06T 7/11 | |
| 10,228,682 B2 * | 3/2019 | Colaianni | A41H 1/02 | |
| 10,482,642 B2 * | 11/2019 | Choi | G06T 11/203 | |
| 10,750,810 B2 * | 8/2020 | Caven | B26D 5/02 | |
| 2002/0002416 A1 * | 1/2002 | Herman Jr. | B26D 5/005 | 700/134 |
| 2010/0089103 A1 * | 4/2010 | Zorzolo | B26F 1/3813 | 69/2 |
| 2014/0114620 A1 * | 4/2014 | Grinspun | A41H 3/007 | 703/1 |
| 2016/0140766 A1 * | 5/2016 | Balachandreswaran | G06F 3/005 | 345/633 |
| 2016/0183617 A1 * | 6/2016 | McKinney | A41H 3/007 | 345/419 |
| 2017/0053447 A1 * | 2/2017 | Chen | G06T 19/006 | |
| 2017/0200313 A1 * | 7/2017 | Lee | H04N 9/3179 | |
| 2021/0087729 A1 * | 3/2021 | Oka | D05B 19/085 | |

* cited by examiner

METHOD OF PROJECTING SEWING PATTERN PIECES ONTO FABRIC

CROSS REFERENCE TO RELATED APPLICATIONS

This application is a continuation application of U.S. application Ser. No. 15/853,807, filed Dec. 24, 2017. The disclosure of the above-referenced application is incorporated herein by reference.

BACKGROUND

1. Field of Invention

This invention relates to a method for projecting sewing patterns or templates onto fabrics, using digitally available patterns, that are formatted in such way, that each patterns piece can be projected onto said fabrics in a readable way, using either high contrast outlines through a projecting device, or an apparatus that recognizes a real environment by using acquired real space information and user information, to generate augmented content that changes corresponding to a change in space or a user's movement, while projecting and visualizing the generated augmented content through a projecting device.

Sewing patterns are the foundation of creating any article of clothing, bag, toy, quilt, home decor object, and anything that can be sewn together. Existing sewing methods used by beginners, consumers, and prosumers (e.g. home sewists) rely on using sewing patterns in the form of paper templates, typically made of tissue paper, tracing paper, printer paper, and the likes, thus serving as a guide when cutting out the fabric.

2. Description of State of the Art

Sewing has been, and still is, a favorite creative pastime for many individuals, mainly due to the fact that clothing is not just a piece of fabric wrapped around a body, but rather a piece of detailed fabric specifically tailored to fit and complement the body.

As such, sewing involves reaching for one's creative mind, to develop unique articles of clothing or other sewn items. Sewing provokes a thought process that even from elementary to high school systems have incorporated sewing classes into their curriculum, as a form of Home Economics. Either way, be it individually, or through groups, sewing typically involves following directions that comprise of acquiring different paper templates, placing those paper templates over the fabric, and properly aligning them by spreading them over a piece of fabric to be cut. After the paper templates or sewing patterns are in their proper place, the individual marks the contours of the templates, and proceeds with cutting the fabric. The pattern or template is then removed, the cut fabric placed on the side, and the operator repeats the process with a new pattern template. Once all pieces of sewing pattern templates have been cut, the operator seams them all together via different techniques known in the art. Therefore, creating a unique article of clothing, tailored to fit and complement the body of an individual.

Regardless of the aforementioned process, the end-product may differ considerably from the image, or baseline shown on the templates particularly, due to variations or movements of the patterns, and the fabric, while setting up, aligning, marking or cutting.

Furthermore, existing methods of sewing patterns onto fabric generate considerable waste, errors, and non-value adding activities. These wastes are typically associated with the time a sewist dedicates to cutting out or preparing the paper pattern pieces, as well as deciding on how to dispose of them later on.

Notwithstanding the aforementioned, advances in technology have been introduced to automate methods for creating articles of clothing, whereby the sewing patterns are stored on a computer unit, the operators selects the desired pattern, the pattern is printed, and a machine performs the cutting. This is a similar process to that seen in the metal manufacturing industries, whereby large sheets of metal are cut to precision in accordance to a pattern and user parameters. Unfortunately, these technologically advanced approaches are very expensive, require a basic understanding of coding, and thus have a high learning curve. Attempts have also been made to reduce the cost of these technologies, by achieving a compromise on the size these machines are able to cut. As such, no satisfactory solution that takes into considerations the aforementioned approaches have been offered to date.

In alternative approaches, methods have been proposed for the leather and shoe industries wherein the cutting process was of primary concern, due to the difficulty of achieving precise shapes. As such, these methods essentially consisted of laser beams, water jets, or precise cutting elements, connected to a computing device that traced patterns residing thereon.

Nevertheless, standard approaches to sewing have been proposed that further integrated existing technology, such as personal computers, and printers, whereby the former would provide the patterns to the printer, for the latter to print those pattern upon a sheet of fabric. Clearly, these incorporations of technologies into the conventional process of sewing, specifically targeted the high-volume industry of clothing, but did not take into account its simplicity, whilst continuously adding unnecessary costs to the process.

Other approaches towards overlaying sewing patterns onto fabrics have been performed by sewing patterns companies who print on paper the sewing templates, whereby said paper is typically made of tissue paper, tracing paper, printer paper, and the likes. Furthermore, sewing pattern designers also create digital sewing patterns for download by customers so that they can print out the pattern pieces and use them as a template on their fabric. These patterns are also made available by individuals who sell their sewing pattern designs on crowdsourcing website for sewists to also download them and print them at their convenience. With these digital sewing patterns, a sewist can use a large plotter to print the sewing pattern onto paper and, therefore cutting down the time it takes to piece the pattern pages together like a puzzle. However, it still involves using paper templates of sewing patterns which after their use, considerations regarding disposal needs to be taken into account, or in the alternative having an available physical storage space.

For those sewists with a need to accelerate the sewing process, approaches have been provided that focus entirely on facilitating the cutting step. As such, one alternative proposes an electronic paper cutting machine that allows sewists to adhere their fabric to a sticky mat that goes through the cutting machine and can automatically cut out the fabric with no paper sewing pattern needed, because the cutting machine holds the pattern information. However, as with the other alternative approaches herewith discussed, this cutting machine is expensive and limited in the size of what it can cut.

SUMMARY

Evidently, sewing does require guidelines to be followed in order to achieve that perfect article of clothing, or other sewn items. Be it for beginner, or experienced consumers they all like the fact that patterns have existed, and that they could be overlaid onto fabric individually, for later assembling. What has been disliked are the solutions proposed to overcome the aforementioned disadvantages. As such, the primary objective of the present invention is to provide a method for easily, and quickly overlay sewing patterns or templates on fabric, while maintaining the traditional steps of the process. Thereby minimizing any major expenditure in advanced technology, as well overcoming any learning curve associated with unfamiliar technology.

As such, the present involves the overlaying of sewing patterns or templates onto fabric to facilitate the process of sewing articles of clothing, bags, toys, quilts, home decor objects, and anything that can be sewn together, using projectors, or augmented reality ("AR") devices that may utilize some combination of processing units, memory storage units, computer interfaces, displays, network connectivity, system of lenses, or cameras. As such, the present proposes various ways of addressing a projection of a sewing contours on fixed environments, typically those fixed environments are flexible materials or fabrics formed by a network of natural, artificial fibers, typically of leather, yarn or thread.

In one of the approaches, various shapes, or contours of sewing patterns or templates are transmitted to a computing device such as a desktop, laptop, smartphone or tablet where they are stored until a control unit withdraws them, which occurs before an operator selects the sewing pattern, and thereafter the projecting device is setup, adjusted, calibrated, and optimized for the sewing patterns to be displayed by the projecting device. Under this approach, the projecting device is found typically supported by a fixture that prevents movement of the projecting device, while displaying, projecting or overlaying the sewing patterns as images onto the fabric. The operator can then cut the fabric following the contours of the sewing patterns overlaid onto the fabric.

In another approach, the shapes or contours of sewing patterns or templates are overlaid on a fabric using computer-generated imagery ("CGI") from at least one projecting device, after the sewing patterns have been transmitted to a computing device, being stored as contours in a storage device, from where the sewing patterns can be drawn upon by means of a control unit, which occurs before an operator selects the sewing pattern, and thereafter the projecting device is setup, adjusted, calibrated, and optimized for the sewing patterns to be displayed on the projecting device. Under this approach, the projecting device can be supported by an operator, or set on a fixture that prevents movement of the projecting device, while displaying, projecting or overlaying the sewing patterns as images on the projecting device. The operator can then cut the fabric following the contours of the sewing patterns displayed on the projecting device.

From the foregoing, it will be appreciated that, although specific approaches of the invention have been described herein for purposes of illustration, various modifications may be made without deviating from the spirit and scope of the invention. Accordingly, the invention is not limited except as by the appended claims.

BRIEF DESCRIPTION OF THE DRAWING

Further features and advantages of the present are illustrated in the drawings in connection with the preferred embodiments, in which.

DETAILED DESCRIPTION

Figure 1:
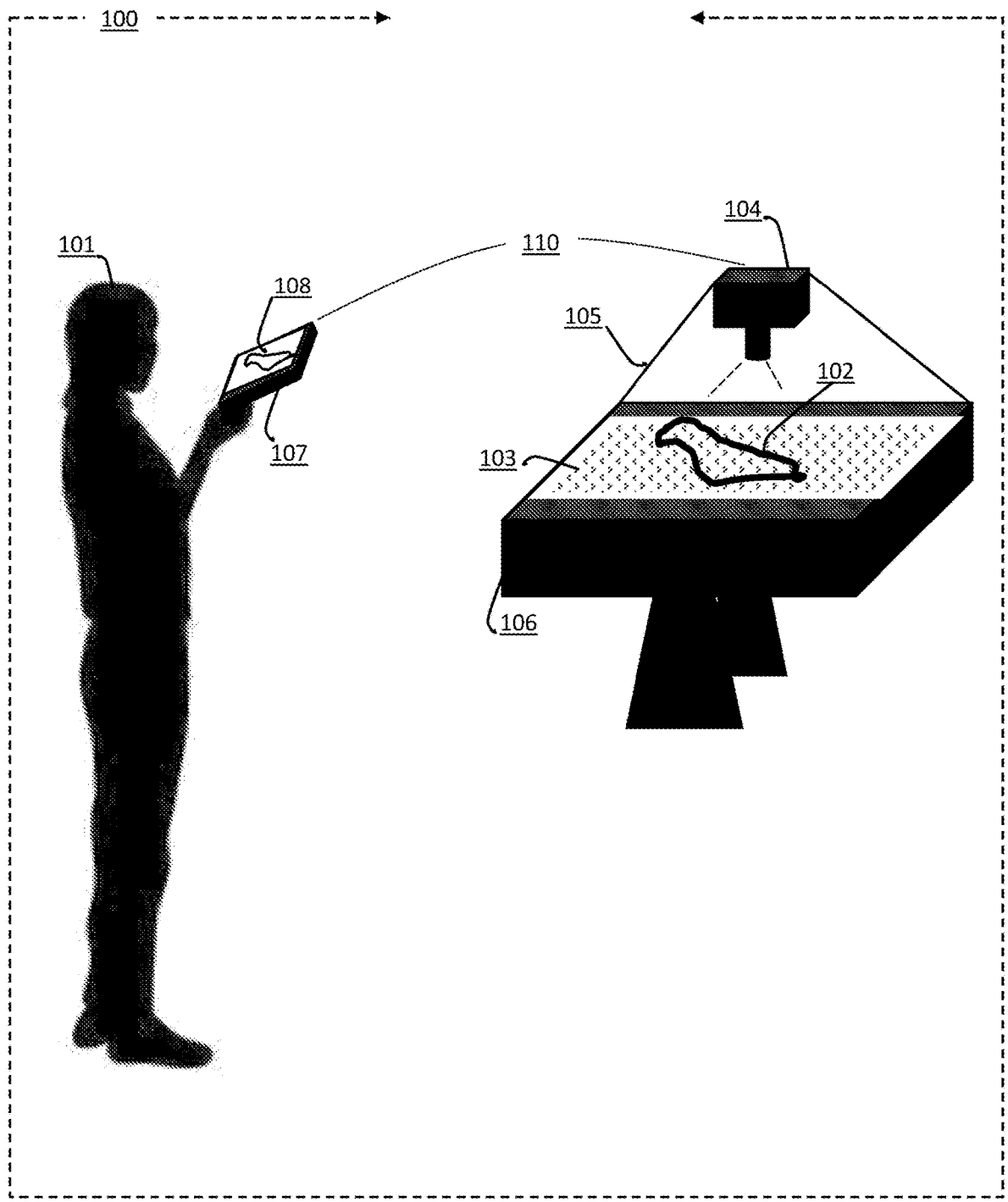
FIG. 1 is a perspective view of the method used to project images of sewing pattern templates onto a cutting fabric.
Figure 2:
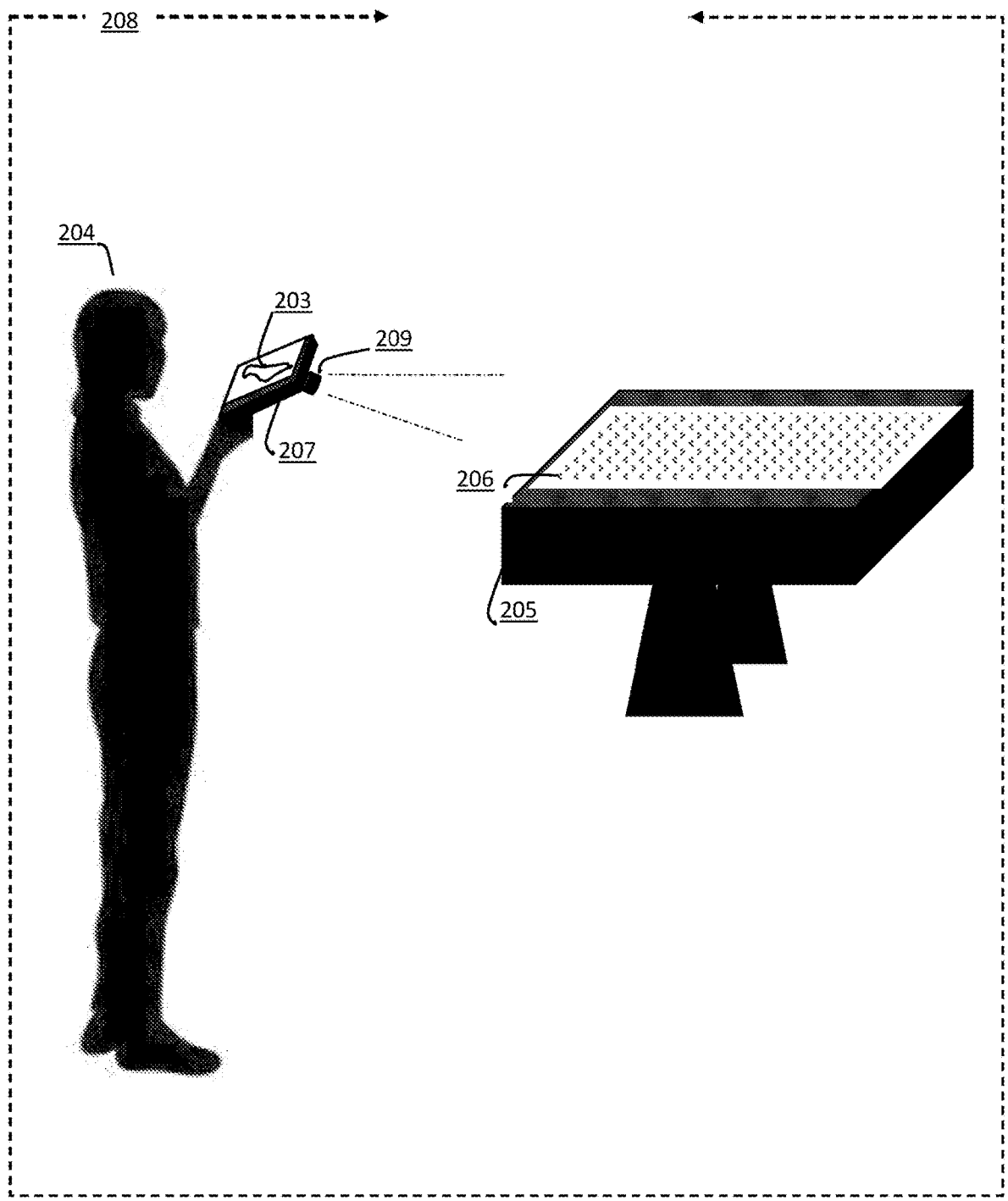
FIG. 2 is another perspective view of the method used to project images of sewing pattern templates onto a cutting fabric.
Figure 3:
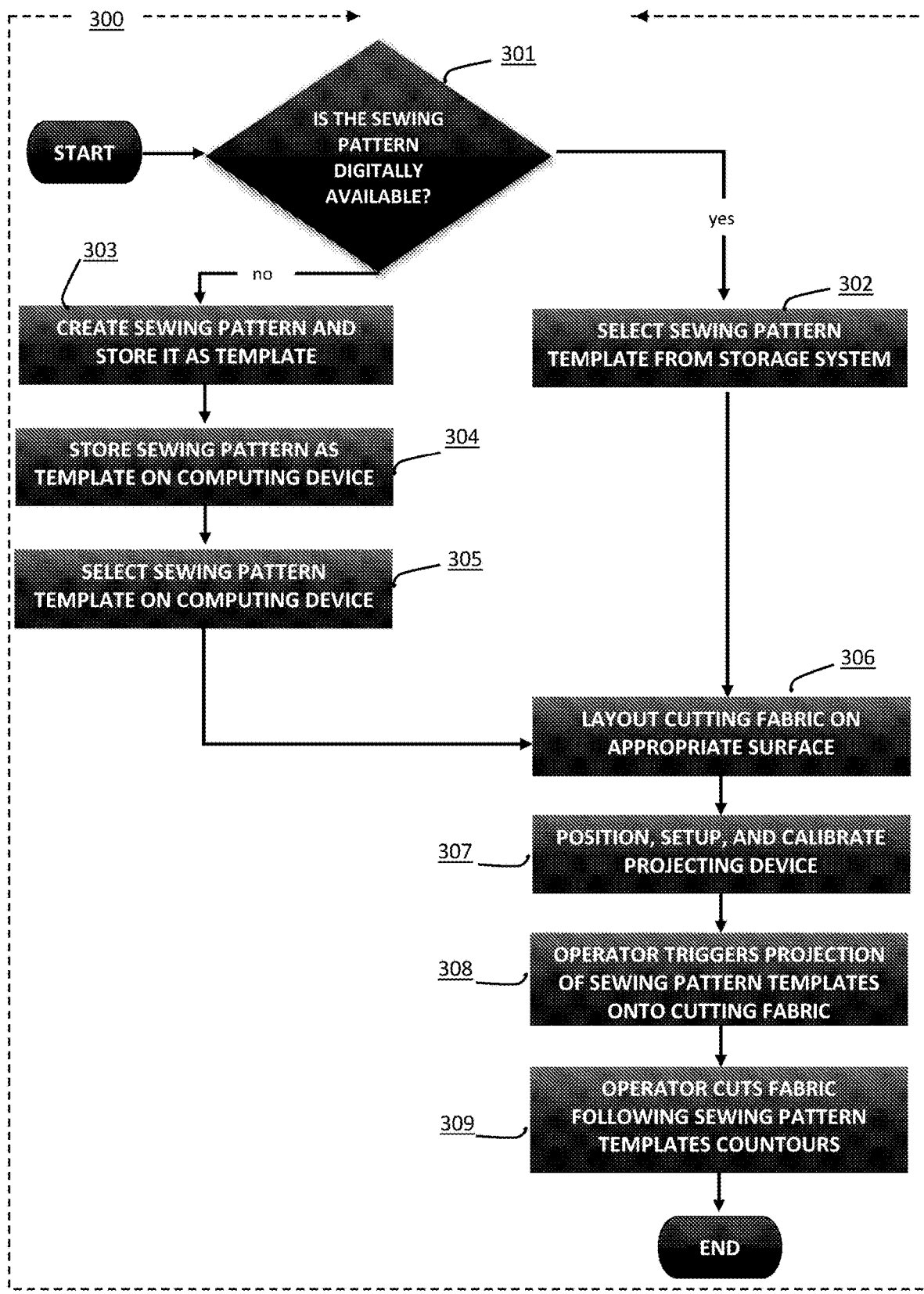
FIG. 3 illustrates a block diagram of the method for projecting sewing pattern templates onto a cutting fabric.

Several embodiments of the invention for projecting sewing pattern templates onto cutting fabrics are illustrated in FIGS. 1, 2 and 3 of the drawing section. Although the subject matter has been described in language specific to enable a person having ordinary skills in the art to make and use the invention, it is to be understood that is not necessarily limited to the specific features described but rather, disclosed as illustrative forms of implementing the claims.

FIG. 1 shows example scenario 100 of using projection device 104 to display images of sewing pattern templates onto fabrics. The operator 101 projects the desired sewing pattern template 102 onto fabrics 103 is using a projecting device 104 mounted on a fixture 105, whereby the fabric 103 is laid out on an appropriate surface like table 106, and the projecting device overlays the sewing pattern template on top of the fabric from above. The projecting device 104 may receive the sewing patent template image wirelessly as shown at 110, hard-wired, or have it already pre-loaded on a computing device such as the smartphone or tablet of 107. The sewing pattern images are displayed on the computing device 107 using the computer-generated imagery ("CGI") of 108.

FIG. 2 shows example scenario 208 of using projection device 207 to display images of sewing pattern templates onto fabric 206 that may be placed on top of an appropriate surface such as table 205. The operator 204 projects the desired 203 sewing pattern template, generated using augmented content that changes corresponding to a change in space or a user's movement, captured through a camera system as shown at 202. The sewing pattern template 203 is displayed on the projection device 207 using computer-generated imagery ("CGI").

FIG. 3 shows an illustrative process 300 of projecting sewing pattern templates onto cutting fabric, illustrated as a collection of blocks in a process flow chart. The blocks represent different operations within the claimed method, that can be implemented in hardware, software, or via extrinsic methods, as well as a combination thereof. In the context of software, the blocks represent computer-executable instructions stored on one or more storage systems that, when executed by one or more computing devices, perform the recited operations. The order in which the operations are described is not intended to be construed as a limitation, and any number of the described operations can be combined in any order or in parallel to implement the processes. It is understood that the following processes may be implemented with other architectures as well.

The process 300 begins at 301, wherein the operator is confronted with a decision that determines the steps to be performed thereafter. At said step in the process, the operator decides whether to use predefined, existing sewing pattern templates, or create new ones. Assuming the operator already preloaded the storage system with pre-defined templates of the liking, it may then proceed to 302, wherein the operator chooses from the set of pre-loaded templates that are found stored within the storage system of the computing device. If the operator was unable to find a preloaded sewing pattern of the liking, at 303 the operator may create one using the computing device. Once the operator finalizes the creation of the desire sewing pattern template, it may then store or save at 304 the template to the computing device by accepting it to be stored. Once the storage step of 304 is completed, the operator at 305 proceeds with the selection of the created sewing pattern template or templates. Upon selection of the desired sewing pattern template or templates, be it from operation 303, or operating 305, the operator at 306 starts laying out the cutting fabric on an appropriate surface. Once the cutting fabric has been laid out, the operator initiates at 307 the process of positioning, setting up, and calibrating the projecting device. At this operation a calibrating pattern may be utilized or projected in order to obtain the optimal settings, all of which requires operator guidance, such as haptic commands, to indicate the projecting device that the operation 307 has been successfully completed.

At 308, and after the computing device determines that the operator entered the right commands, the sewing pattern template is triggered by the operator, and displayed onto the cutting fabric. The operator then positions, or accommodates the projecting device on the desired, and appropriate surface, such as a flat surface like a table, and proceeds with 309, which involves cutting the fabric along the lines of the sewing pattern templates. Once the operator has completed the activity as indicated by the last step, the process ends, and can be repeated multiple times, until all pieces of fabric have been cut, all along the computing device tracks of the progress made by the operator until the operator fully achieves the complete cutting of the article of clothing.

It is claimed:

1. A method of projecting a sewing pattern onto a cutting fabric, the method comprising the steps of:
   providing a sewing pattern having one or more contours on a computing device to a projecting device for projecting the one or more contours onto a cutting fabric;
   placing a cutting fabric on an appropriate surface;
   positioning, calibrating, and setting up the projecting device to project the one or more contours through the projecting device;
   triggering the projection device to project a projection of the one or more contours onto the cutting fabric;
   cutting the cutting fabric in accordance with the one or more contours of the sewing pattern.

2. The method of projecting a sewing pattern onto a cutting fabric of claim 1 further comprising the step of optimizing the position of the at least one or more contours of the sewing pattern relative the cutting fabric.

3. The method of projecting a sewing pattern onto a cutting fabric of claim 1 where the one or more contours of the sewing pattern are overlaid on the cutting fabric by a computer-generated image from the projection device.

4. The method of projecting a sewing pattern onto a cutting fabric of claim 1 where the sewing pattern is stored on the computing device.

5. The method of projecting a sewing pattern onto a cutting fabric of claim 1 where the sewing pattern is generated by the computing device.

6. The method of projecting a sewing pattern onto a cutting fabric of claim 1 where the step of optimizing comprises modifying the sewing pattern to correct at least one of distortion, brightness, saturation, or contrast elements of the one or more contours.

7. The method of projecting a sewing pattern onto a cutting fabric of claim 1 where the appropriate surface is at least one surface selected from the group of a wall, a table, a desk, a chair, and a ceiling and maintains the cutting fabric in a flat position.

8. The method of projecting a sewing pattern onto a cutting fabric of claim 1 where the at least one or more contours of the sewing pattern is generated by an augmented reality device.

9. The method of projecting a sewing pattern onto a cutting fabric of claim 8 where the augmented reality device comprises a processing unit, a storage unit, a computer interface, a display, a network connectivity device, and a camera.

10. The method of projecting a sewing pattern onto a cutting fabric of claim 8 where the augmented reality device generates the at least one or more contours of the sewing pattern by recognizing the cutting fabric by using acquired real space information and acquired user information, recognizing a real environment comprising a user's movement relative to the cutting fabric, calculating an interaction between the recognized real environment and a virtual environment, and combining the virtual environment with the real environment.

11. The method of projecting a sewing pattern onto a cutting fabric of claim 8 where the augmented reality device generates an augmented computer-generated image of the one or more contours of the sewing pattern by analyzing real space through image processing and machine learning based on real space information comprising depth information and point information.

12. The method of projecting a sewing pattern onto a cutting fabric of claim 1 where the one or more contours of the at least one contours of the sewing pattern are modified by an augmented reality device.

13. The method of projecting a sewing pattern onto a cutting fabric of claim 12 where the augmented reality device modifies the one or more contours of the sewing pattern for at least one of size, position, angle, distortion, brightness, saturation, and contrast.

14. The method of projecting a sewing pattern onto a cutting fabric of claim 1 where the cutting fabric is a flexible material comprising a network of at least one material selected from the group of natural fibers, artificial fibers, leather, yarn, and thread.

15. The method of projecting a sewing pattern onto a cutting fabric of claim 1 where the cutting fabric is a flexible material formed by at least one of the group of weaving, knitting, crocheting, knotting, and felting.

16. A system of projecting a sewing pattern onto a cutting fabric, the system comprising:
    a sewing pattern having one or more contours where the one or more contours are provided on a computing device;
    a projecting device for projecting the one or more contours;
    the computing device comprising a control unit, where the control unit calibrates and sets up the projecting device to optimize the projection of the one or more contours on the cutting fabric.

17. The system of projecting a sewing pattern onto a cutting fabric of claim 16 further comprising a support fixture for preventing movement of the projecting device during projection of the one or more contours.

18. The system of projecting a sewing pattern onto a cutting fabric of claim 16, the projector further comprising a system of lenses for projecting the one or more contours as images in the form of a plurality of pixels in a first direction and a plurality of pixels in a second direction perpendicular to the first direction.

19. The system of projecting a sewing pattern onto a cutting fabric of claim 16 where the computing device is selected from a desktop, a laptop, a smartphone and tablet.

20. A system of projecting a sewing pattern onto a cutting fabric comprising
   a sewing pattern provided on a computing device having a projecting device where an augmented reality device of the computing device generates or modifies one or more contours of the sewing pattern and projects the one or more contours through the projecting device onto a cutting fabric where the one or more contours for cutting the cutting fabric relative the one or more contours.

\* \* \* \* \*